(12) United States Patent
Skultety-Betz et al.

(10) Patent No.: US 7,583,071 B2
(45) Date of Patent: Sep. 1, 2009

(54) LOCATING DEVICE

(75) Inventors: Uwe Skultety-Betz, Leinfelden-Echterdingen (DE); Bjoern Haase, Stuttgart (DE); Reiner Krapf, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 10/592,657

(22) PCT Filed: Feb. 1, 2005

(86) PCT No.: PCT/EP2005/050411

§ 371 (c)(1),
(2), (4) Date: Jun. 26, 2007

(87) PCT Pub. No.: WO2005/088348

PCT Pub. Date: Sep. 22, 2005

(65) Prior Publication Data

US 2007/0290671 A1    Dec. 20, 2007

(30) Foreign Application Priority Data

Mar. 12, 2004  (DE) ...................... 10 2004 012 072

(51) Int. Cl.
    G01V 3/11  (2006.01)
(52) U.S. Cl. ........................................ 324/67; 324/228

(58) Field of Classification Search ............. 324/66–67, 324/228, 326, 329–331, 345
See application file for complete search history.

(56) References Cited

U.S. PATENT DOCUMENTS

| 3,662,255 | A | | 5/1972 | Garrett |
| 4,859,931 | A | * | 8/1989 | Yamashita et al. ............ 324/67 |
| 4,998,058 | A | | 3/1991 | Tofte et al. |
| 5,649,546 | A | * | 7/1997 | Steinbeck ................... 600/550 |

FOREIGN PATENT DOCUMENTS

| DE | 37 43 180 | 7/1988 |
| DE | 195 04 841 | 8/1996 |
| WO | WO 93/00039 | 1/1993 |

OTHER PUBLICATIONS

International Search Report and Written Opinion for PCT/EP2005/050411, dated May 18, 2005.
English Language Abstract of WO 93/00039, Jan. 1993.
English Language Abstract of DE 195 04 841, Aug. 1996.

* cited by examiner

*Primary Examiner*—Bot L LeDynh
(74) *Attorney, Agent, or Firm*—Kenyon & Kenyon LLP

(57) ABSTRACT

A locating device, in particular a hand-held locating device, for detecting objects enclosed in a medium, including an output unit for displaying at least one output variable correlated with a measuring signal of at least one sensor of the locating device, the output unit having a first dynamic range for displaying the output variable correlated with the measuring signal. At least one further dynamic range having a changed sensitivity compared to the first dynamic range is displayable via the display unit.

15 Claims, 2 Drawing Sheets

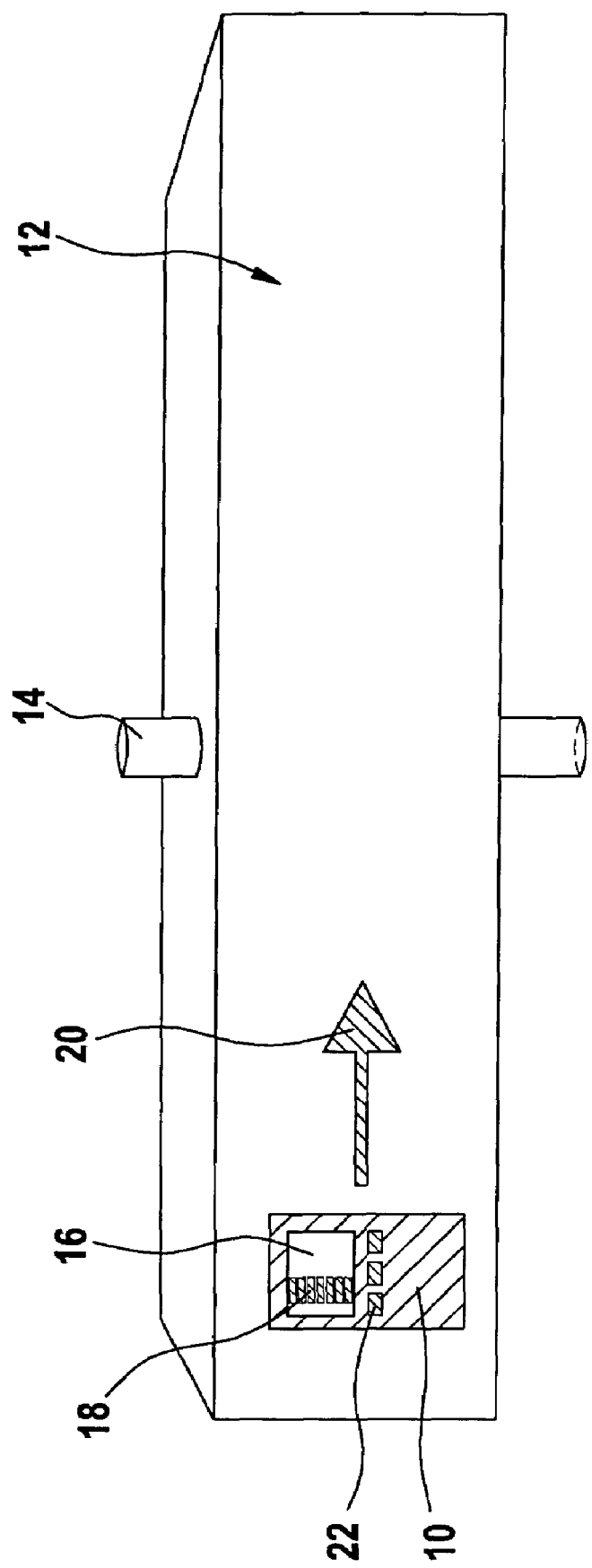

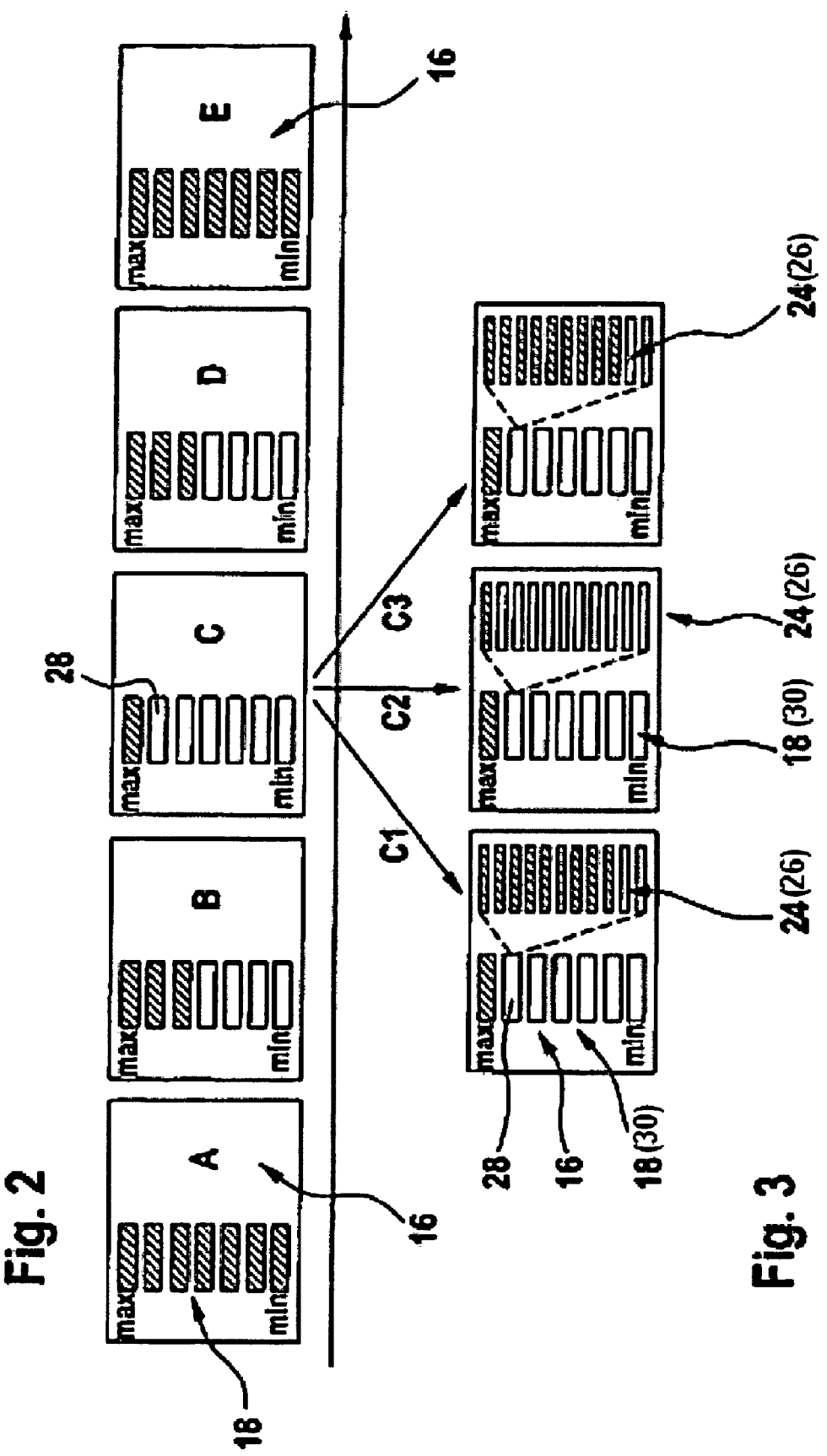

LOCATING DEVICE

FIELD OF THE INVENTION

The present invention relates to a locating device, in particular a hand-held locating device, for detecting objects enclosed in a medium.

BACKGROUND INFORMATION

Locating devices are used to detect, for example wires, pipes, metal bars, wooden beams or other objects embedded in walls, ceilings or floors. Inductive devices, among other things, are used, i.e., devices that generate a magnetic field which is disturbed by the metallic objects enclosed in a medium. In addition to the inductive devices, capacitive devices, line voltage detectors and high-frequency detectors are also used.

Most of these devices must be calibrated when powered on or at regular intervals. For this purpose, an internal electronic adjustment is usually carried out which must take place in a measurement environment in which no objects to be located may be present close to the measuring device sensor. For example, metal locating devices must be calibrated at a great distance from any metal present in the vicinity. To do this, for example, the device must be held in the air away from the wall to be examined.

The enormous dynamics of the sensors used, which occur despite calibration of the measuring device, present a problem that arises, in particular, with inductive and capacitive locating devices. In addition to the depth of the objects to be measured in the surrounding medium, the extremely wide range of dynamics of the measuring signal of sensors of this type, also results, for example, from the type of metal detected. For example, a copper cable embedded deep in a wall generates a sensor signal that is several times weaker than, for example, an iron pipe embedded at a depth of 2 cm. Due to the limited display area of the locating devices according to the related art, dynamics of this type are difficult to display.

To date, two methods are known from the related art which make it possible to solve the problem associated with the enormous dynamic range.

It is possible to design the measuring device display so that the entire dynamic range is shown. This is achievable, for example, by a logarithmic scale for the display variable correlated with the measuring signal. However, the disadvantage of a display of this type is that weak or even very strong objects appear at the beginning and end of the dynamic range of the displayed scale and are therefore very difficult to locate, since the changes shown in the measuring device display are too small.

A method for designing the measuring device so that it automatically determines the necessary sensitivity is also known from the related art. The measuring device is operated so that it is first set to maximum sensitivity and, when a strong measuring signal is detected, the sensitivity is reset so that the representation of the output variable of the measuring device correlated with the measuring signal always remains in the center of the viewing area available in the device display. To achieve this, however, the measuring device must be passed multiple times over the object to be measured to make the necessary sensitivity settings. In addition, the user loses the information about the absolute signal strength.

SUMMARY OF THE INVENTION

The locating device according to the present invention advantageously enables at least two dynamic ranges to be displayed via its output unit when reading an output variable correlated with the measuring signal of the existing sensor. The display area of the output unit provided in the device may therefore be fully utilized, making it very easy to detect the location of the maximum measuring signal.

To improve the displayability of the measuring signal demonstrating a high level of dynamics, it is advantageous to equip the locating device with a first and at least one second dynamic range, the at least one second dynamic range having a higher sensitivity of the output variable correlated with the measuring signal in relation to the measuring signal. This makes it possible, using the first dynamic range, to carry out a rough measurement and, in the range of maximum values for the output variable correlated with the measuring signal, to actively switch to a second dynamic range, i.e., in a manner controlled by the user. Because, when using the second dynamic range, the output variable of the locating device has a higher sensitivity toward the measuring signal, the determination of the absolute maximum of the measuring signal, and thus the precise location of the enclosed object generating the measuring signal, is guaranteed.

It is advantageously possible to design the output unit of the measuring device so that the output variable correlated with the measuring signal is displayed in the first and in at least one second dynamic range at the same time.

The output variable of the locating device correlated with the measuring signal is therefore advantageously displayed visually, in particular via a display provided in the measuring device. The visual display of the output variable correlated with the measuring signal makes it possible to show the measuring signal simultaneously in a display of the first dynamic range and in a display of the second dynamic range at higher sensitivity.

In alternative embodiments of the measuring device according to the present invention, the output variable correlated with the measuring signal is advantageously displayable alternately in either the first dynamic range or at least one second dynamic range, depending on the requirements. For this purpose, the locating device according to the present invention has switching means which enable the user to switch back and forth between the at least two dynamic ranges or to use both dynamic ranges in parallel. In this manner, it is possible to manually adjust the sensitivity of a measurement to the current strength of the existing measuring signal and thus achieve a fine output resolution for the output variable correlated with the measuring signal. The advantage of a manual sensitivity adjustment lies in the fact that full use of the output unit provided in the locating device, which may advantageously be a visual display, may be made. This makes it substantially easier to accurately determine the precise position and, if necessary, even the center of an object, for example a metal or wooden object, since the latter corresponds to the maximum of the measuring signal. A sensitivity setting designed in such a user-friendly manner unmistakably provides the user with full control over the device and gives him/her the information he/she needs without requiring any complicated or incomprehensible control elements.

In an advantageous embodiment of the locating device according to the present invention, the output variable correlated with the measuring signal is displayed in discrete, individual steps. In the case of a visual output unit, it is possible, for example, to display this variable in the form of segment graphs.

In an embodiment of the locating device according to the present invention, it is possible to assign the at least one second dynamic range to a discrete output value of the first dynamic range for the purpose of representing the output variable correlated with the measuring signal. In particular, it is advantageous to select the size of the second dynamic range so that it corresponds to the dynamic range of only one segment in the display of the first dynamic range of the output unit. This provides the user of the locating device according to the present invention with a kind of "zoom function" which transfers the strength of the output variable in the first dynamic range of the output unit to a second dynamic range for the output unit, using a higher sensitivity:

BRIEF DESCRIPTION OF THE DRAWINGS

FIG. 1 shows a schematic representation of a typical measurement situation for locating an object enclosed in a medium.

FIG. 2 shows schematic representations of a display of a conventional locating device according to the related art, depending on the position of the locating device on the object to be examined, as shown in FIG. 1.

FIG. 3 shows an exemplary embodiment of the display of the output variable of a locating device according to the present invention.

DETAILED DESCRIPTION

FIG. 1 shows a typical measurement situation for a locating device. Locating device 10 is passed over the surface of a medium 12 to be examined which may be, for example, a wall, a floor or the ceiling of a building, to thereby detect the position of an object 14 enclosed in medium 12. An object of this type may be, for example, an electrical wire, pipes such as water pipes, metal bars, wooden beams or other objects.

Locating device 10 according to the present invention has, in particular, an inductive and a capacitive sensor which make it possible to locate and perhaps even identify an object 14 enclosed in medium 12 on the basis of the magnetic or electrical fields generated by the sensors. In addition to corresponding control electronics, the appropriate power supply system and an evaluation unit for the detected measuring signal, locating device 10 according to the present invention has, in the exemplary embodiment according to FIG. 1, a graphical display 16 which displays an output variable which is correlated with the strength of the measuring signal of the locating device. The output variable is represented by a bar graph 18, the number of illuminated bars between a minimum value and a maximum value representing a measure for the measuring signal. In addition to the display of the output variable shown in FIG. 1, using a bar graph 18, other output forms are possible, in particular other optical segment graphs. For example, a round, in particular circular, display field may be used, the illuminated angular range of this display being correlated with the strength of the measuring signal. In this display mode, a full-scale deflection of the measuring unit would correspond to a complete 360° illumination of the display. Smaller measuring signals would be represented by a correspondingly smaller illuminated angular range. It would be possible to build this alternative display from discrete angle elements, for example of 5 or 10 degrees of angle each, or to be a continuously luminous field.

FIG. 2 shows a sequence of schematic representations A through E of display 16 of a measuring device according to the related art when moving a measuring device of this type in the direction of arrow 20 in FIG. 1. The representations of displays A through E are assigned more or less to the position of measuring device 10 in FIG. 1. If measuring device 10 is positioned at a great distance from an object 14 to be detected, the measuring signal achieved via the corresponding sensor is weak, or even absent altogether, so that the output variable correlated with the measuring signal is set to zero (display representation A in FIG. 2). If locating device 10 approaches an object 14 enclosed in medium 12, the measuring signal rises, as does the output variable correlated with the measuring signal. For example, an average value which is represented by discrete bar display 18, for example by three illuminated bars, is shown in display representation B. If locating device 10 is passed over object 14, the measuring signal rises substantially, which produces a maximum deflection on display 16 of the locating device (display representation C).

In this measurement situation in the vicinity of enclosed object 14, devices according to the related art, in particular, may result in the measuring signal being so strong over a long distance traveled by locating device 10 in the area of object 14 to be detected that only maximum deflection 28 of the output variable according to the representation of display C of the measuring device is displayed over the entire range. Since in this case the device displays, for example, the full-scale deflection over a long distance moved, it is not possible to precisely locate the position of enclosed object 14.

If the locating device continues to be moved past object 14 to be detected in the direction of arrow 20 in FIG. 1, the measuring signal and thus the output variable decrease gradually, as is shown schematically in assigned display representations D and E in FIG. 2.

Using locating device 10 according to the present invention, it is advantageously possible, in particular in the range of high signal strengths which result in the vicinity of an object 14 to be located, to represent, via output unit 16 of locating device 10, at least one further dynamic range having a higher sensitivity compared to the first dynamic range (according to the representations of displays A through E).

Switching means 22 are provided for this purpose on the locating device according to the present invention, which in the manner of a "zoom" function or button "freeze" the signal of first bar graph 18, which corresponds to a representation of the measuring signal in a first dynamic range 30, and adjust the sensitivity of device 10 to the current signal strength. At the same time, as in the exemplary embodiment in FIG. 3, a second, finer scale 24 is also displayed in the form of a bar graph which possesses a dynamic range 26 having a much higher sensitivity toward changes in the measuring signal. In particular, it is advantageous to set second dynamic range 26, which is represented by fine scale 24, so that it corresponds only to the specific dynamic range of achieved, maximum discrete display value 28 of first dynamic range 30, which is represented by bar graph 18.

FIG. 3 shows a schematic representation of an optical display 16 of the locating device according to the present invention in the vicinity of an object 14 to be detected. While a display in measuring devices according to the related art (see FIG. 2) would have a maximum deflection over the entire range (see display representation C or "rough scale" 18 in FIG. 3), the measuring device according to the present invention enables the maximum to be precisely determined for the measuring signal by adding and displaying a second dynamic range 26.

For all three positions of the locating device represented in FIG. 3 by the displays (C1, C2, C3) of the measuring signal, first bar graph 18 shows maximum value 28 according to first dynamic range 30. Based on fine scale 24, which is adjusted, with regard to the sensitivity of the output variable, from the measured variable to the current signal strength of the measured variable and is thus able to respond much more sensitively to signal changes, the user of the locating device according to the present invention is able to detect the precise position of the signal maximum (display C2 in FIG. 3) for the measuring signal. Using second dynamic range 26 or its representation by fine scale 24, the user is able to locate the precise location and possibly even the center of object 14.

The operation of switching means 22 ("zoom" button) may also be designed so that fine scale 24 is displayed in display 16 of measuring unit 10 only while button 22 is being pressed. A design of this type is comparable to a "zoom function," since it enables the signals present on the current measured surface to be displayed much more accurately than is possible via a rough scale, which must cover the entire possible measuring range.

In alternative embodiments of display 16 of locating device 10 according to the present invention, the user is able to use corresponding switching means to switch between the two display modes of first dynamic range 30 and second dynamic range 26, so that only one bar graph is present in display 16 of the measuring device.

Of course, the described type of sensitivity setting using a second dynamic range does not have to be implemented by a digital display. Appropriate embodiments may also be implemented with analog instruments.

The locating device according to the present invention is not limited to an optical output unit. For example, the principle of selectable dynamic ranges may also be implemented via an acoustic output.

The locating device according to the present invention is not limited to the embodiment illustrated in the figures.

In particular, the locating device according to the present invention is not limited to the use of an inductive or capacitive sensor. A locating device which includes at least one inductive sensor and at least one capacitive sensor and other optional detectors, such as a line voltage detector, a high-frequency detector or a radar sensor, may be advantageously implemented.

The locating device according to the present invention thus enables its user to manually adjust the sensitivity of the device to the signal strength when an object is detected, thus obtaining a fine display resolution of the measuring signal.

What is claimed is:

1. A locating device for detecting objects enclosed in a medium, comprising:
    an output unit for displaying in discrete output values at least one output variable correlated with a measuring signal of at least one sensor, the output unit having a first dynamic range for displaying the output variable correlated with the measuring signal, wherein at least one second dynamic range having a modified sensitivity compared to the first dynamic range is displayable via the output unit, wherein the at least one second dynamic range is assigned to at least one discrete output value of the first dynamic range for the purpose of displaying the output variable correlated with the measuring signal.

2. The locating device according to claim 1, wherein the sensitivity to the measuring signal of the output variable correlated with the measuring signal is higher in the at least one second dynamic range compared to the first dynamic range.

3. The locating device according to claim 1, wherein the output variable correlated with the measuring signal is displayed simultaneously in the first dynamic range and in the at least one second dynamic range of the output unit.

4. The locating device according to claim 1, wherein the output variable correlated with the measuring signal is displayed in one of the first dynamic range and the at least one second dynamic range of the output unit.

5. The locating device according to claim 4, wherein a switch between the first dynamic range and the at least one second dynamic range is controlled by a user.

6. The locating device according to claim 5, further comprising a switching element which enables the user to adjust the sensitivity of a measurement to an instantaneous strength of the measuring signal.

7. The locating device according to claim 1, wherein the output variable correlated with the measuring signal is indicated acoustically.

8. The locating device according to claim 1, wherein the locating device is a hand-held device.

9. A locating device for detecting objects enclosed in a medium, comprising:
    an output unit for displaying in the form of at least one segment graph at least one output variable correlated with a measuring signal of at least one sensor, the output unit having a first dynamic range for displaying the output variable correlated with the measuring signal, wherein at least one second dynamic range having a modified sensitivity compared to the first dynamic range is displayable via the output unit, wherein the at least one second dynamic range is selectable so that it corresponds to a dynamic range of a segment in the first dynamic range of the output unit.

10. The locating device according to claim 9, wherein the sensitivity to the measuring signal of the output variable correlated with the measuring signal is higher in the at least one second dynamic range compared to the first dynamic range.

11. The locating device according to claim 9, wherein the output variable correlated with the measuring signal is displayed simultaneously in the first dynamic range and in the at least one second dynamic range of the output unit.

12. The locating device according to claim 9, wherein the output variable correlated with the measuring signal is displayed in one of the first dynamic range and the at least one second dynamic range of the output unit.

13. The locating device according to claim 9, wherein a switch between the first dynamic range and the at least one second dynamic range is controlled by a user.

14. The locating device according to claim 9, further comprising a switching element which enables the user to adjust the sensitivity of a measurement to an instantaneous strength of the measuring signal.

15. The locating device according to claim 9, wherein the locating device is a hand-held locating device.

* * * * *